United States Patent [19]

Makita et al.

[11] 4,262,526
[45] Apr. 21, 1981

[54] ROTATIONAL POSITION DETECTING APPARATUS

[75] Inventors: Kunio Makita, Chiryu; Masahiro Sato, Toyoake, both of Japan

[73] Assignee: Nippondenso Co., Ltd., Kariya, Japan

[21] Appl. No.: 52,213

[22] Filed: Jun. 26, 1979

[30] Foreign Application Priority Data

Jul. 21, 1978 [JP] Japan ................................. 53-89692
Jul. 24, 1978 [JP] Japan ................................. 53-90089

[51] Int. Cl.³ ........................................... G01M 15/00
[52] U.S. Cl. ....................................... 73/116; 123/416
[58] Field of Search ........................... 73/116, 117.3; 123/117 D, 416, 417

[56] References Cited

U.S. PATENT DOCUMENTS

| | | | |
|---|---|---|---|
| 3,625,054 | 12/1971 | Vesper et al. | 73/116 X |
| 4,018,202 | 4/1977 | Gartner | 123/117 D X |
| 4,079,709 | 3/1978 | Schuette | 123/117 D |
| 4,162,666 | 7/1979 | Maioglio | 123/117 D |

FOREIGN PATENT DOCUMENTS

2004388 3/1979 United Kingdom ................ 123/117 D

*Primary Examiner*—Jerry W. Myracle
*Attorney, Agent, or Firm*—Cushman, Darby & Cushman

[57] ABSTRACT

This invention discloses a rotational position detecting apparatus for an internal combustion engine for detecting the rotational position of a crank shaft of the engine. The apparatus comprises a rotating disk driven by the engine and giving a large number of angular information signals and also a rotating disk having one reference information on the periphery thereof, an angle sensor for detecting the angular informations on the disk, a rotational reference sensor for detecting the reference information on the disk, waveform reshaping circuits for reshaping the output signals of said both sensors, and an electric circuit for determining the angular position and the reference position from the outputs of said waveform reshaping circuits, wherein a logical product of the reshaped output of the angle sensor and the reshaped output of the reference sensor is implemented, and the time of either one of the rise or fall of an output signal of the logical product is set to be an angular position, while the other one is set to be a reference position.

2 Claims, 11 Drawing Figures

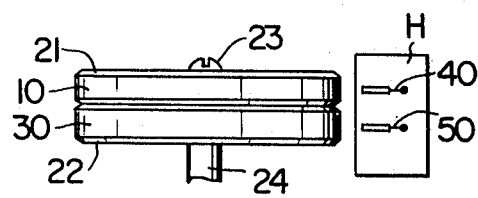
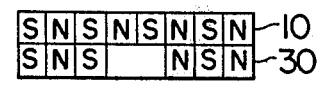
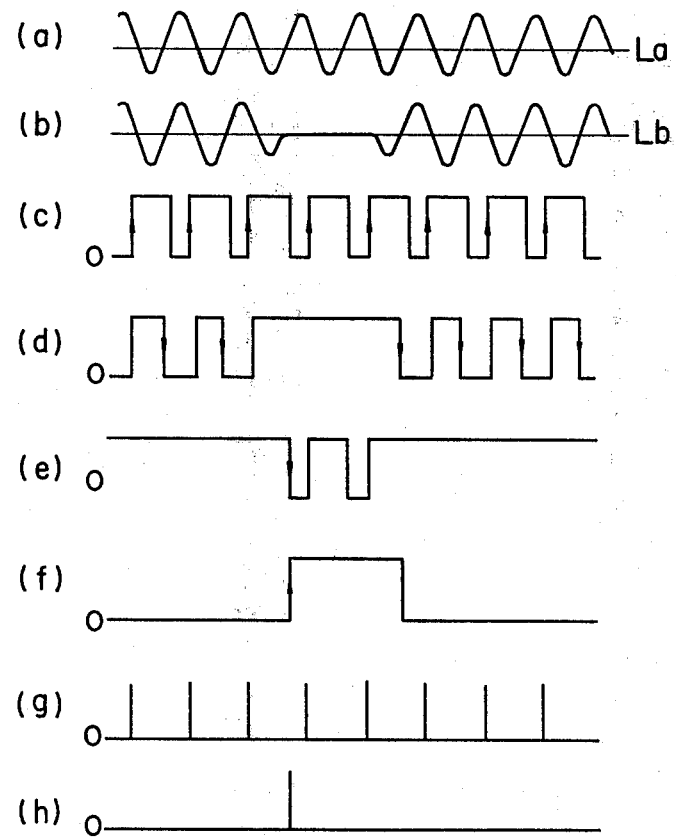

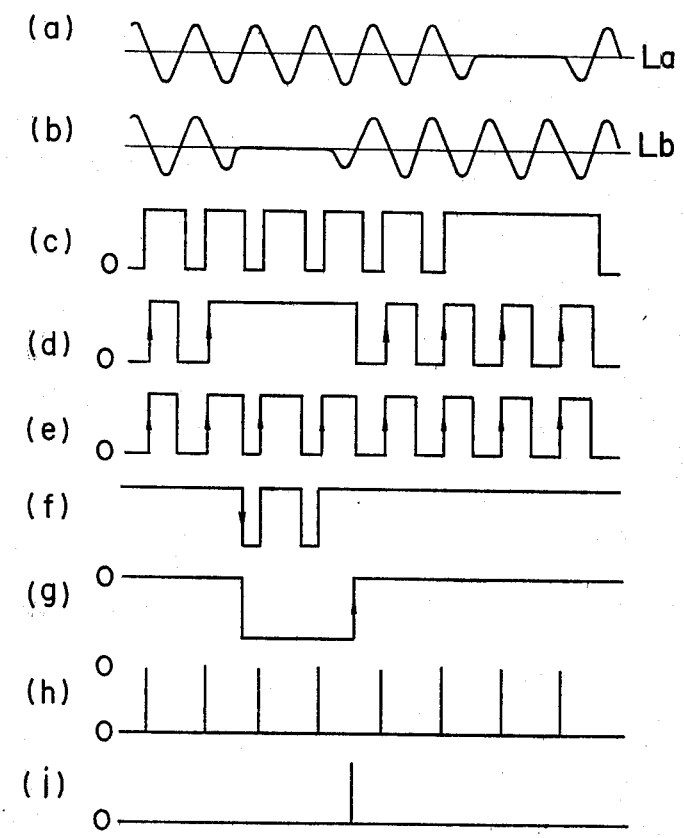

ROTATIONAL POSITION DETECTING APPARATUS

BACKGROUND OF THE INVENTION

This invention relates to a rotational position detecting apparatus for detecting the rotational position of the crank shaft of an internal combustion engine, which can be applied to the ignition system of the engine.

Recently, in the ignition system of an internal combustion engine, it has been proposed to calculate electronically the ignition time in accordance with the operation state of the engine. If the ignition time is set by a rotation angle of the crank shaft between its reference angular position and an angular position for generating a spark after the rotational position of the crank shaft reached the reference angular position, it is necessary to detect the rotational reference position and the rotational angular position of the crank shaft. Conventionally, in order to meet this requirement, the angular position and the reference position have been detected as an angular signal and a reference signal by independent or different sensors respectively. Therefore, in the conventional system the positional relation between the angle and the reference signals varies with an error during manufacture, the number of revolution of the sensor, the temperature characteristic and the threshold voltage of a waveform reshaping circuit. Thus, it occurs that the reference signal and the angular signal are generated within a very short time that an operation processing circuit yields an error signal of angle. There is a further problem that it is difficult to obtain a constant phase between the reference signal and the angle signal.

In a further conventional method, a logical operation was implemented between the angle and the reference signals to determine the angular position and the reference position from the result of the logical operation, however, the conventional methods are not sufficient to overcome the above drawbacks.

SUMMARY OF THE INVENTION

According to this invention, output signals of the angle sensor and the rotational reference sensor are reshaped into rectangular waves and a logical operation between these waves is implemented. The angular position is determined by any one of a rise or fall of the rectangular wave obtained by wave reshaping the output signal of the angle sensor, while the reference position is determined by another one of the fall or rise of the rectangular wave. It is an object of this invention to provide a rotational position detecting apparatus for an internal combustion engine free from any shift of reference signal, due to a setting error of a sensor and free from any operation error by keeping a constant angular relation between the reference position and the angular position, by using the above method of determining the angular and reference positions.

BRIEF DESCRIPTION OF THE DRAWINGS

FIG. 4 is an elevational view showing schematically the mechanical construction of a rotational detecting part of the apparatus of FIG. 3.

FIG. 5 is a diagram showing a magnetization state of a rotational body in the rotational detecting part of FIG. 4.

FIG. 6 shows waveforms at various parts of the apparatus of FIG. 3 for the explanation of the operation thereof.

FIG. 11 shows waveforms at various parts of the apparatus of FIG. 7 when the rotational detecting part of FIG. 9 is applied thereto.

DESCRIPTION OF THE PREFERRED EMBODIMENTS

Figure 1:
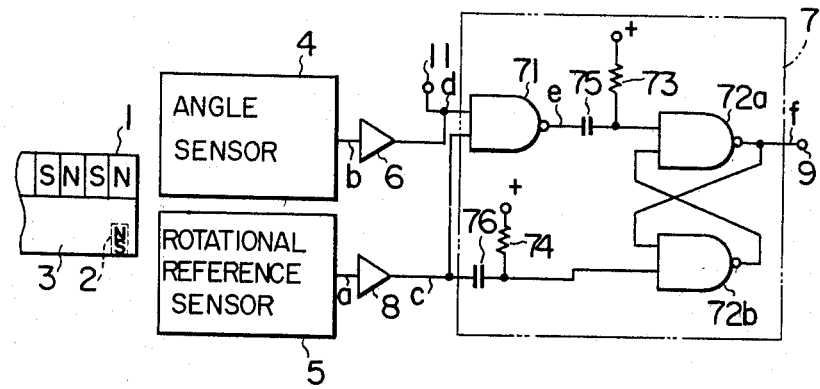
FIG. 1 is an electric circuit diagram showing the first embodiment of an apparatus according to this invention.

The invention will be explained hereinafter with reference to embodiments shown in the drawings. In the first embodiment of FIG. 1, the reference numeral 1 denotes a disk for angle or, that is, a disk for obtaining an angular information, which disk rotates in synchronism with the crank shaft of the internal combustion engine and on the periphery of which many magnetic poles for angular information are magnetized in an equispaced fashion. 2 denotes a reference magnet, and 3 denotes a disk for reference or a disk for obtaining a reference information made of non-magnetic material. The disk 3 rotates with the disk 1. The reference magnet is buried in the reference position of the disk 3. 4 denotes an angle sensor while 5 denotes a rotational reference sensor. These sensors 4 and 5 are constituted with magnetic resistive elements. 6 and 8 denote reshaping circuits for the angle and the reference signals respectively, which convert the output signals of the sensors 4 and 5 into rectangular waveforms. 7 is a logic circuit, in which 71 is a NAND circuit, 72a and 72b and NAND circuits constituting an R-S flip-flop circuit, 73 and 74 are resistors, and 75 and 76 are condensers. The resistor 73 and the condenser 75, and the resistor 74 and the condenser 76 constitute differentiation circuits respectively. 9 is an output terminal for the reference signal. The reference position is defined by a rise of the reference signal which appears at the output terminal 9. 11 is an output terminal for the angular signal. The angular position is defined by a rise of the angular signal which appears at the output terminal 11. The output terminals 9 and 11 are connected to an electronic ignition time control means (not shown). Since various types of electronic ignition time control means are publicly known, no detailed explanation of it will be necessary. In FIG. 1, terminals with a symbol "+" are connected to a positive pole terminal of a constant voltage power source.

Figure 2:
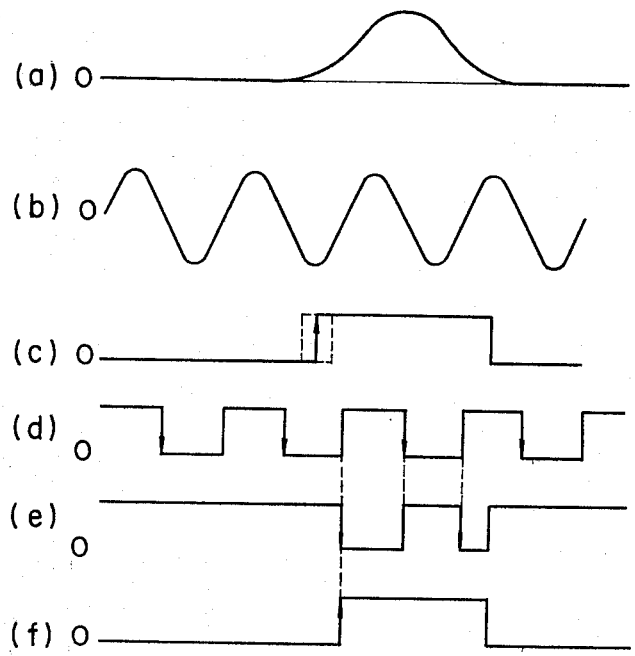
FIG. 2 shows waveforms at some sections of the apparatus of FIG. 1 for the explanation of the operation thereof.

Next, the operation of the above circuit construction will be explained. When the crank shaft of an internal combustion engine rotates, the angle sensor 4 generates an output waveform as shown in (b) of FIG. 2 every time the crank shaft rotates for a certain angle. When the magnet at the reference position is opposed to the rotational reference sensor 5, that is, when the crank shaft reaches the reference position, the rotational reference sensor 5 generates an output waveform as shown in (a) of FIG. 2. These waveforms are converted by waveform reshaping circuits 8 and 6 for the reference and the angular signals respectively into rectangular pulses as shown in (c) and (d) of FIG. 2. The angular position is defined by the fall of the pulse as shown in (d) of FIG. 2. In this case, since separate magnets and sensors are used for the reference and for the angle respectively, it may occur that the phases of the rectangular pulses generated by the waveform reshaping circuits 8 and 6 shifts or changes with temperature or the number of revolutions, etc. as indicated by broken lines in (c) of FIG. 2. Therefore, if the rise of the pulse shown in (c) of FIG. 2 is used as the reference position, the angular position and the reference position may approach each other to such an extent that it causes an operation error in an operation processing circuit in the following state (not shown). It is preferable, therefore, that the reference positional signal be generated substantially at the center of the period of the signal indicating an angular position.

In the embodiment of FIG. 1, therefore, a logical operation of the pulses shown in (c) and (d) of FIG. 2 is implemented by the NAND circuit 71 to obtain an output as shown in (e) of FIG. 2. The R-S flip-flop circuit is set and reset by the fall of this output and the fall of the pulse shown in (c) of FIG. 2 respectively through differentiation circuits. Through this arrangement, the required reference position is obtained at the rise of the pulse of (e) in FIG. 2, as shown in (f) of FIG. 2. This position is at the center of the angular position and does not change under the phase shift of the pulse shown in (c) of FIG. 2. By the use of the flip-flop circuit, the pulse of (f) in FIG. 2 appears only once at the reference position regardless of the number of falls of the pulse of (d) in FIG. 2, so that no error operation occurs.

Figure 3:
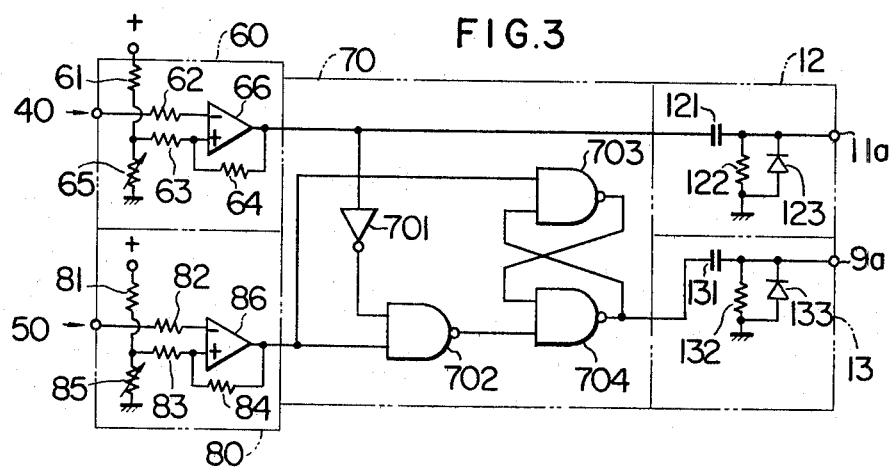
FIG. 3 is an electric circuit diagram showing the second embodiment of an apparatus according to this invention.

FIGS. 3 to 5 show the second embodiment of this invention. FIG. 4 shows the mechanical construction of the rotational position detecting part. 10 denotes a disk for angle, on which many magnetic poles corresponding to angular informations are placed as shown in FIG. 5. 30 denotes a disk for reference, on which many magnetic poles corresponding to angular information are placed in the same phases as those on the disk 10 but the portion or magnetic poles corresponding to the reference informations are omitted as shown in FIG. 5. The both disks are fixed to a shaft 24 by a screw 23 through fixing disks 21 and 22. The shaft 24 is driven by the crank shaft of the internal combustion engine. Around the periphery of the disks 10 and 30, an angle sensor 40 and a rotational reference sensor 50 are disposed to oppose the disk peripheries respectively. The sensors 40 and 50 arranged in the detecting head H at the same position with respect to the axial direction to generate alternating current outputs of substantially the same phase as shown in (a) and (b) of FIG. 6.

FIG. 3 shows a circuit construction, comprising a waveform reshaping circuit 60 for angle consisting of resistors 61 to 64, an adjusting resistor 65 and a comparator 66; a logic circuit 70 consisting of an inverter 701, a NAND circuit 702 and NAND circuits 703 and 704 constituting a flip-flop circuit; a waveform reshaping circuit 80 for reference consisting of resistors 81 to 84, an adjusting resistor 85 and a comparator 86; a differentiation circuit 12 for angle consisting of a condenser 121, a resistor 122 and a diode 123; and a differentiation circuit 13 for the reference consisting of a condenser 131, a resistor 132 and a diode 133. 9a denotes an output terminal for the reference signal while 11a an output terminal for the angular signal. The input operation level of the waveform reshaping circuit 60 for the angle is adjusted at $L_a$ as shown in (a) of FIG. 6 by the adjusting resistor 65. The waveform as shown in (a) of FIG. 6 of the angle sensor 40 is reshaped into a rectangular waveform as shown in (c) of FIG. 6. The input operation level of the waveform reshaping circuit 80 for the reference is adjusted at a value a little higher than the level $L_b$ shown in (b) of FIG. 6 by the adjusting resistor 85. The waveform of the rotational reference sensor 50 as shown in (b) of FIG. 6 is reshaped into a waveform as shown in (d) of FIG. 6. Thus, the output waveform of the NAND circuit 702 becomes as shown in (e) of FIG. 6. The flip-flop circuit of NAND circuits 703 and 704 is set by the fall of the output signal of the NAND circuit 702 and is reset by the fall of the output signal of the waveform reshaping circuit 80 for the reference. As a result, the NAND circuit 704 generates an output as shown in (f) of FIG. 6. The rise of the output signal of the waveform reshaping circuit 60 for angle is differentiated by the differentiation circuit 12 for angle to generate a differentiated signal at the angular signal output terminal 11a as shown in (g) of FIG. 6. The times at which the differentiated signals are generated are set or assumed as the angular positions respectively. Further, the rise of the output signal of the NAND circuit 704 is differentiated by the differentiation circuit for reference 13 to generate a differentiated signal at the reference signal output terminal 9a as shown in (h) of FIG. 6. The time at which the differentiated signal appears is set or assumed as the reference position. In the circuit shown in FIG. 3, if a circuit which is triggered by the rise of the output signal is used as the circuit of the latter stage, it is needless to say that the differentiation circuits 12 and 13 may be omitted.

Figure 7:
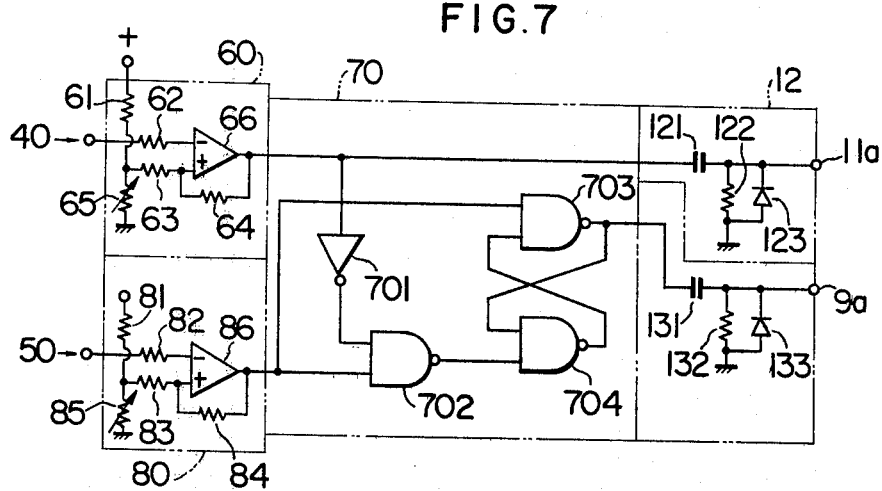
FIG. 7 is an electric circuit diagram showing the third embodiment of an apparatus according to this invention.

FIG. 7 shows an electric circuit diagram according to a third embodiment of this invention, in which a part of the circuit construction of FIG. 3 is modified. In the circuit of FIG. 7, instead of connecting the output terminal of the NAND circuit 704 to the differentiation circuit 13 for reference, the output of the NAND circuit 703 is connected thereto. Other parts of the circuit construction are the same as those of the circuit of FIG. 3. Therefore, like reference numerals are used to denote like parts as shown in FIG. 3. The outputs of the angle sensor 40 and the rotational reference sensor 50 are applied to the circuit of FIG. 7 in the same way as it is in the circuit of FIG. 3.

Figure 8:
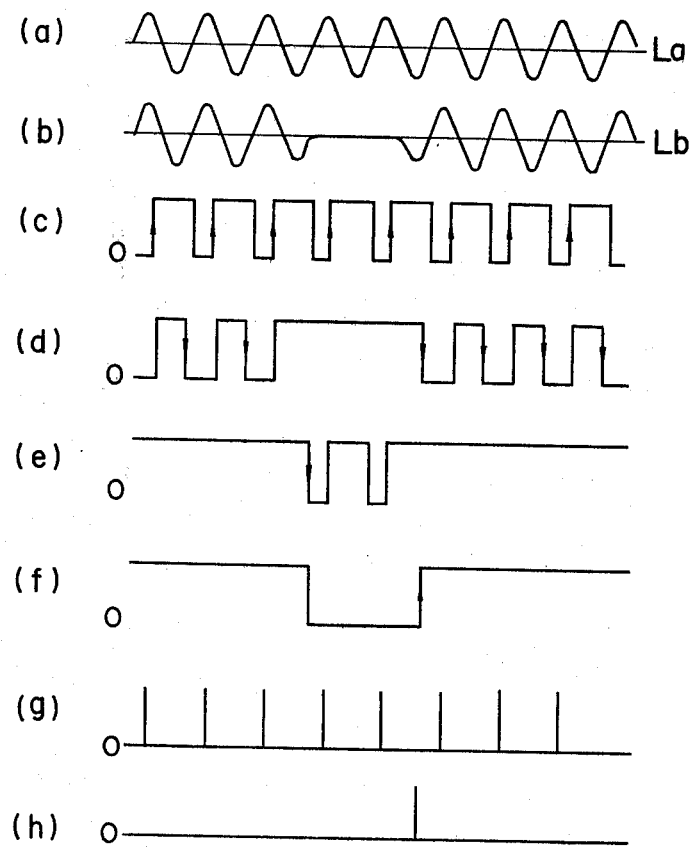
FIG. 8 shows waveforms at various parts of the apparatus of FIG. 7 for the explanation of the operation thereof.

FIG. 8 shows waveforms of the signals at various parts of the circuit in FIG. 7. The waveforms shown in (a), (b), (c), (d), (e) and (g) of FIG. 8 show the output waveforms of the angle sensor 40, reference sensor 50, waveform reshaping circuit 60 for angle, waveform reshaping circuit 80 for reference, NAND circuit 702, and differentiated signal which appears at the output terminal 11a of the angular signal respectively, which are the same as the signals shown in (a), (b), (c), (d), (e), and (g) of FIG. 6. As in the case of the circuit of FIG.

3, the input operation levels of the waveform reshaping circuit for angle 60 and the waveform reshaping circuit for reference 80 are adjusted to be equal to the $L_a$ level of (a) in FIG. 8 and a level a little more positive than the $L_b$ level of (b) in FIG. 8, respectively. The waveform (f) in FIG. 8 shows the output waveform of the NAND circuit 703 whose 1 and 0 signal levels are opposite to those of the output waveform of the NAND circuit 704 shown in (f) of FIG. 6. That is, at the rise and the fall of the waveform (f) in FIG. 6, waveform (f) in FIG. 8 falls and rises respectively. The waveform (h) in FIG. 8 shows the output waveform of the differentiation circuit for reference 13. The differentiation circuit 13 differentiates the rise of the output signal of the NAND circuit 703 to generate a differentiated signal as shown in (h) of FIG. 8.

Figure 9:
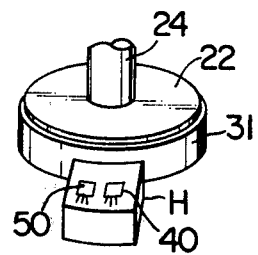
FIG. 9 is a perspective diagram showing schematically another embodiment of a rotational detecting part which may be applied to the apparatus of FIG. 3 or to the apparatus of FIG. 7.
Figure 10:
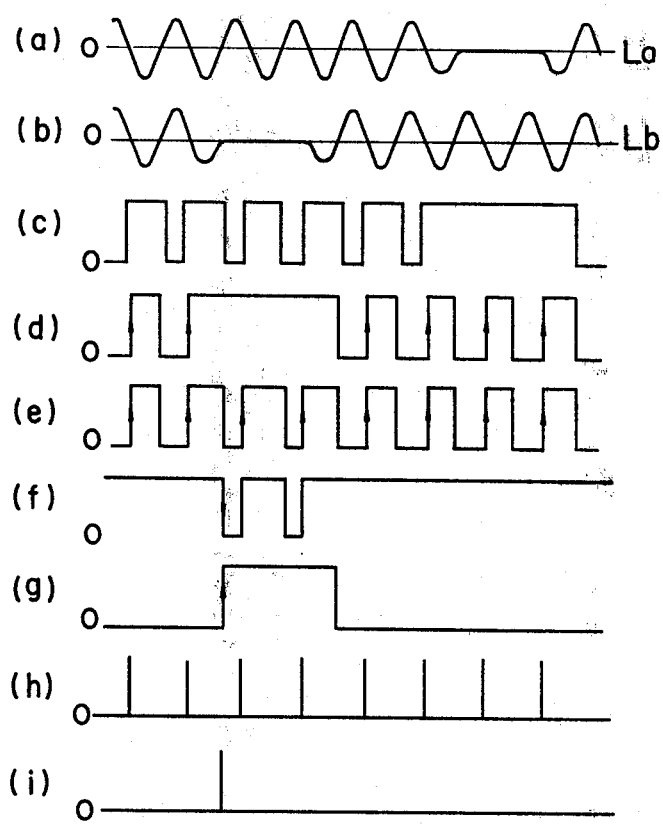
FIG. 10 shows waveforms at various parts of the apparatus of FIG. 3 when the rotational detecting part of FIG. 9 is applied thereto.

FIG. 9 shows the mechanical construction of a rotational detecting part used instead of the detecting part in FIG. 4. FIG. 10 shows the waveforms of the signals at various parts of the circuit of FIG. 3. When the rotational detecting part of FIG. 9 is used in place of the detecting part as shown in FIG. 4. In FIG. 9, only the disk for reference 30 and the disk for angle 31 as shown in FIG. 4 are used. To the periphery of the disk 31 both sensors 40 and 50 are oppositely disposed, which generate alternating current outputs as shown in (a) and (b) of FIG. 10. The outputs of these sensors 40 and 50 are reshaped or converted into rectangular waveform signals as shown in (c) and (d) of FIG. 10. The logical AND of these rectangular waveform signals are implemented by an AND circuit (not shown) to generate a waveform as shown in (e) of FIG. 10, and the signal of (e) is applied to the inverter 701 and the differentiation circuit for angle 12 in FIG. 3 instead of the output signal of the waveform reshaping circuit for angle 60. As a result, the NAND circuits 702 and 704 generate outputs with their waveforms as shown in (f) and (g) of FIG. 10 respectively. The differentiation circuits 12 and 13 produce outputs with waveforms as shown in (h) and (i) of FIG. 10.

FIG. 11 shows waveforms at various parts of the circuit in FIG. 7 in the case when the rotational detecting part shown in FIG. 9 is used instead of the part shown in FIG. 4. Waveforms shown in (a) to (f) and (h) of FIG. 11 are the same as those shown in (a) to (f) and (h) of FIG. 10, respectively. The waveform shown in (g) of FIG. 11 is the output waveform of the NAND circuit 703 and the signal level of the waveform is a reverse of that of the waveform of (g) in FIG. 10 showing the output of the NAND gate 704. Therefore, the waveform shown in (i) of FIG. 11 which is the output waveform of the differentiation circuit 13 becomes different from that of (i) in FIG. 10.

In the above-mentioned embodiments the sensors 4, 5, 40 and 50 are constructed with a magnetic resistive element, however, they may be constructed with a Hall element. Further, if the rotational body is constructed with a disk of magnetic material toothed to have teeth corresponding to the angular information, the sensor may be constructed with an electromagnetic pick-up made by combining a signal coil and a permanent magnet.

Although in the above-mentioned embodiments the time of the rise of the rectangular pulse of the waveform reshaping circuits for angle 6 and 60 is determined to be the angular position and the time of the fall of the pulse is determined to be the reference position, the angular and the reference positions may be determined by the fall and the rise of the rectangular pulse respectively.

In the above-mentioned embodiments the output signal of the flip-flop circuit is reset by the rear edge of the output signal corresponding to the reference information of the waveform reshaping circuit for the reference, it may be reset by the fall or the rise of the output signal of the waveform reshaping circuit for angle which output signal appears after the rear edge of the output signal of the waveform reshaping circuit for angle. In such a case, the reset point may be determined as the reference position.

As described above, according to this invention, the angular and reference information of a rotational body is detected by the angle and the reference sensors respectively, the output signals of both sensors are converted into rectangular waves by waveform reshaping circuits for the angle and the reference, a logical operation of the output signals of the waveform reshaping circuits is implemented, either the rise or the fall of the rectangular pulse of the waveform reshaping circuit for angle is determined as the angular position while the reference position is determined by the fall or the rise. Therefore, between the reference position and the angular position a constant phase relation is kept and no operational error occurs. Moreover, the invention has an excellent effect of avoiding any shift of the reference position due to a position error of the rotational reference sensor or variations in temperature and number of revolutions.

We claim:
1. A rotational position detecting apparatus for an internal combustion engine having a rotatable output shaft comprising:
  disk means coupled to said rotatable output shaft, said disk means being provided thereon with a reference information and a plurality of equi-spaced angular informations;
  first sensor means positioned to face said disk means, said first sensor means providing a train of first output signals in timed relation with the passing of said equi-spaced angular information therethrough;
  second sensor means positioned to face said disk means, said second sensor means providing a second output signal in timed relation with the passing of said reference information therethrough;
  first reshaper means connected to said first sensor means for reshaping said first output signals into a train of first pulse signals;
  second reshaper means connected to said second sensor means for reshaping said second output signal into a second pulse signal;
  gate means connected to said first reshaper means and said second reshaper means for gating said first pulse signals in response to said second pulse signal; and
  bistable means connected to said second reshaper means and said gate means, said bistable means being driven into a first stable state at the output change in said first pulse signals by rise or fall thereof, said first pulse signals being passed through said gate means, and being driven into a second stable state at the output change in said second pulse signals, wherein the time position where the output of said bistable means changes to the first stable state defines a reference position, and a time position at the fall or rise of said first pulse signals, which fall or rise is opposite to the rise or fall of said first pulse signals to drive said bistable means, defines an angular position.

2. A rotational position detecting apparatus for an internal combustion engine having a rotatable output shaft comprising:
   disk means coupled to said rotatable output shaft and having two parallel circumferential tracks;
   first information means provided on one of said circumferential tracks of said disk means at every predetermined angular interval;
   second information means provided on the other of said circumferential tracks of said disk means in phased relation with said first information means, said second information means being omitted at a predetermined position;
   first sensor means positioned to face said one of said circumferential tracks for providing a train of first sensor signals in timed relation with the passing of said first information means therethrough;
   second sensor means positioned to face said the other of said circumferential tracks for providing a train of second sensor signals in timed relation with the passing of said second information means therethrough;
   first reshaper means for reshaping said first sensor signals into a train of first pulse signals;
   second reshaper means for reshaping said second sensor signals into a train of second pulse signals;
   gate means for gating said first pulse signals in response to said second pulse signals; and
   bistable means driven into a first stable state at the output change in said first pulse signals by rise or fall thereof, said first pulse signals being passed through said gate means, and driven into a second stable state at the output change in said second pulse signals wherein the time position where the output of said bistable means changes to the first stable state being determined as a reference position, and a time position at the fall or rise of said first pulse signals, which fall or rise is opposite to the rise or fall of said first pulse signals to drive said bistable means, defines an angular position.

* * * * *